United States Patent

Cook et al.

[15] 3,649,195
[45] Mar. 14, 1972

[54] RECOVERY OF ELECTRICAL ENERGY IN CARBON BLACK PRODUCTION

[72] Inventors: Charles F. Cook; Elliott P. Doane; Marvin M. Johnson, all of Bartlesville, Okla.

[73] Assignee: Phillips Petroleum Company

[22] Filed: May 29, 1969

[21] Appl. No.: 829,047

[52] U.S. Cl. .......................... 23/209.4, 23/209.6, 23/259.5, 310/10
[51] Int. Cl. ..................................... C09c 1/50, H02n 11/00
[58] Field of Search ......................... 23/209.4, 209.6, 259.5; 310/10, 2, 4

[56] References Cited

UNITED STATES PATENTS

| | | |
|---|---|---|
| 2,638,555 | 5/1953 | Marks ........................................ 310/4 |
| 3,225,225 | 12/1965 | Wattendorf et al. ........................ 310/6 |
| 3,468,632 | 9/1969 | Gunnell et al. ........................... 23/259.5 |
| 3,405,291 | 10/1968 | Brandmaier ............................. 310/10 |
| 3,474,266 | 10/1969 | Koupal ..................................... 310/5 |

OTHER PUBLICATIONS

Gourdine et al., " Mechanical Engineering," July 1966, pp. 46–48

Primary Examiner—Edward J. Meros
Attorney—Young and Quigg

[57] ABSTRACT

A method and apparatus for electrical energy extraction from the smoke of a carbon black reactor prior to quench by establishing electrodes within the reaction zone and establishing electron flow therebetween, the power being recovered through an external electrical circuit.

9 Claims, 2 Drawing Figures

INVENTORS
C. F. COOK
E. P. DOANE
M. M. JOHNSON

BY *Young & Quigg*
ATTORNEYS

RECOVERY OF ELECTRICAL ENERGY IN CARBON BLACK PRODUCTION

This invention pertains to carbon black.

In one of its more specific aspects, this invention pertains to energy recovery from the pyrolytic decomposition of hydrocarbon.

The production of carbon black by the pyrolytic decomposition of a hydrocarbon is well known. Generally, this process involves decomposing a hydrocarbon feed at about atmospheric pressure and a temperature in the range of about 2,200° to about 3,500° F. in the presence of a fuel, with a quantity of oxygen insufficient for the complete combustion of the fuel and hydrocarbon charge stock. The carbon black is produced in particulate form within a gas stream comprised principally of nitrogen and oxides of carbon. This gas stream is generally referred to as smoke, and in the aftersection of the reactor, this smoke is quenched with water to facilitate separation of the black from the gases.

The particulate carbon black, when initially formed, exists as positively charged fragments, and a method has been developed to recover electrical energy from these carbon black fragments prior to quenching. The method of this invention provides such a process.

According to the method of this invention there is provided a process for recovering electrical energy from an unquenched smoke stream produced by the pyrolytic decomposition of a hydrocarbon which comprises decomposing the hydrocarbon under carbon black forming conditions to produce carbon black and electrons, separating the electrons from the carbon black in a first zone, passing the charged carbon black particles at decreased pressure to a second zone, establishing a flow of the separated electrons to the second zone, neutralizing the charged black particles in the second zone with the electrons and recovering the electrical energy generated.

According to the apparatus of this invention there is provided a carbon black reactor comprising a chamber, reactant introductory means into the chamber, a burner for at least one of said reactants, a first electrode positioned adjacent and downstream of said burner, a second electrode positioned adjacent and downstream of said first electrode, current conduction means connecting said electrodes, and carbon black recovery means downstream of said second electrode.

Accordingly, it is the object of this invention to provide a more efficient carbon black producing process.

It is another object of this invention to facilitate recovery of by product energy from the carbon black producing process.

As mentioned, the carbon black particles in the proximity of the burner flame exist as positively charged fragments. Electrons also exist in the reaction environment. These electrons are of comparatively low mass and high charge, whereas the carbon black particles have a high mass. Accordingly, the application of an electric field by means of a first electrode establishes a high intensity field sufficient to accelerate the electrons and change their direction of travel, at the same time being comparatively ineffectual in these respects relative to the comparatively massive carbon particles. Accordingly, the carbon particles continue through the reactor and pass that means or electrode employed for establishing the electric field.

The electric field established by means of the first electrode can be accomplished by impressing an alternating current on the first electrode to initiate the flow of electrons thereto. Having established the flow thereto, the electrons flow through the external circuit to a subsequently discussed second electrode placed downstream. At this point the neutralization of the charged carbon black particles occurs, with the current so generated being only slightly diminished by the continual application of the initiating current to the first electrode. The power required by the initiating current need be comparatively small, for example, being a few percent of the total recovered power.

The amperage developed by such a system is related to the number of electrical charges passing the first electrode and contacting the second electrode in a unit time. Inasmuch as there is no net production of charged particles, the number of electrons flowing through the external circuit is sufficient to recombine with the positively charged carbon particles at the second electrode to produce the final neutral carbon black product.

The voltage developed by such a system is related to the amount of work done on the positively charged carbon black particles before their neutralization takes place on the second electrode. This work is related to the energy of expansion which takes place when a pressure drop occurs. Neglecting the forces of friction at the walls confining the zone, and that small change in the kinetic energy of the gas in relationship thereto, the work associated with separating the charged particles is proportional to the pressure drop. Inasmuch as reactor wall friction is negligible, and there is no significant transfer of heat through the reactor walls, the electrical energy is also related to the change in temperature of the gas.

The above provides the basis for the process and apparatus of the present invention. Hence, from the amount of carbon black production, there can be approximated the carbon black particle size and density. From the total number of elemental charges per particle, the maximum obtainable current is calculable as the product of the total number of particles per unit time and the number of charges per particle.

The obtainable power is calculable as a function of the temperature change during the cooling of the gas. With the voltage and charge density known, the force required to produce the separation of charges can be calculated. This force is proportional to the change in pressure of the gas in the system per unit of system length.

The following is presented in clarification of the principles set forth above and consists of a design of the process and reactor of this invention.

A carbon black production of 11,600 pounds carbon black per hour is contained in a total of 69,600 pounds per hour of smoke which is cooled from 3,000° to 2,000° F. At a specific heat of about 0.27 B.t.u./lb. for the smoke, the potential recoverable power is about 5,400 kilowatts per hour.

Assuming that the average carbon black particles size is 300 A., and the density of the carbon black is about 1.4 g./cm.$^3$, the number of carbon atoms per particle is about $1 \times 10^6$. Accordingly, there are about $3.4 \times 10^{22}$ particles per hour. Assuming that the total number of elemental charges per particles is about $1 \times 10^3$, the recoverable power is available at 382 volts.

In general, this invention can be practiced by establishing in that zone in which the reaction takes place, two electrodes between which current is caused to flow. These electrodes may be established at any point within the reaction zone, may be established at any distance apart, and may be of any size and configuration.

In general, a greater amount of energy will be extracted by establishing the first of these electrodes in the area of maximum chemical reaction and by providing the electrode of such area to provide a maximum impinging surface for the electrode.

On this basis, the reactor illustrated in the attached drawing is suitable for this operation.

Figure 1:
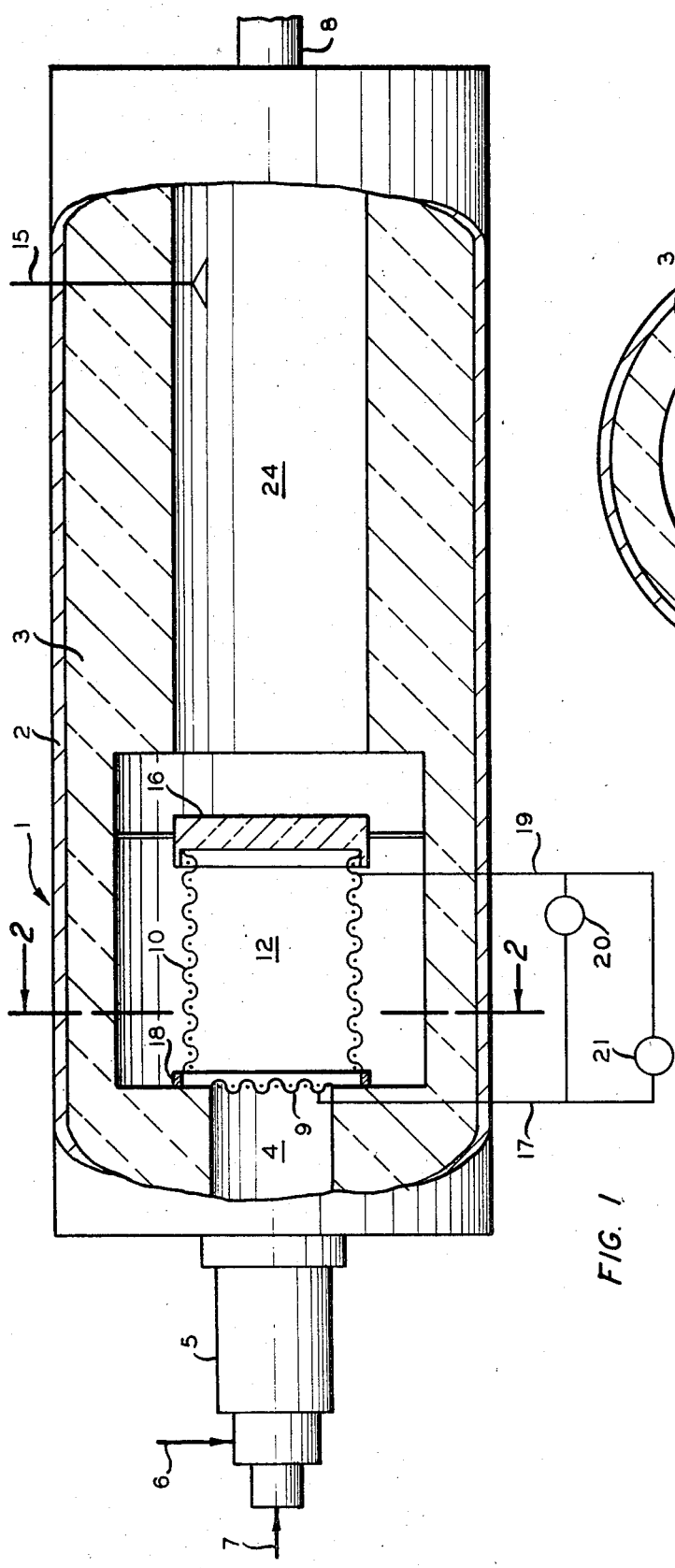
FIG. 1 shows the carbon black reactor of this invention, suitable for performing the method of this invention, in cross-sectional elevation.
Figure 2:
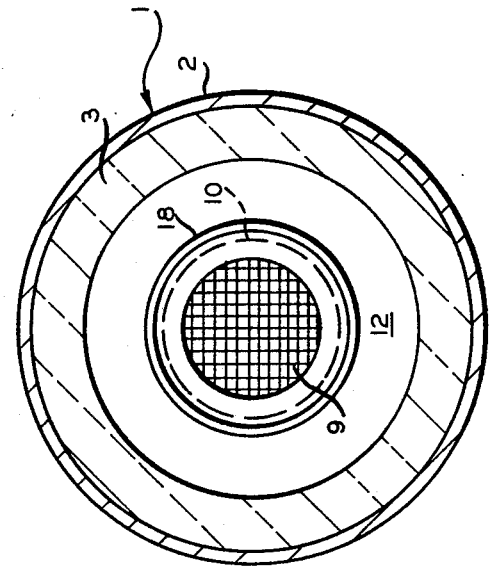
FIG. 2 is a cross-sectional elevation through section 2—2 of FIG. 1.

Referring to FIG. 1, there is shown a carbon black reactor 1 which enclosed a series of reaction zones within insulation 3 enclosed by shell 2.

While reactor 1 can be any typical reactor in which the necessary electrodes can be established, the following description is meant to illustrate a reactor found suitable under the conditions serving as a basis for the foregoing conditions.

Reaction zone 4 was closed at its upstream end by conventional burner 5 which was equipped with a plurality of inlet conduits, of which 6 and 7 are typical, for the conventional introduction of hydrocarbon feed, fuel and oxidant.

Reaction zone 4 was terminated by electrode 9, a grid-type electrode extending across the reactor and having a diameter approximating that of zone 4. It was of grid construction, the elements of the grid being spaced apart to avoid obstructing the passage of carbon black through it. It was placed immediately outside of the flame impingement area in the zone in which the reaction temperature was about 3,000° F.

Within reaction zone 12, electrode 10 was positioned. It was spaced apart from electrode 9 and suitably supported on supports 16 and 18. In order to provide maximum collision surface for the carbon black, it was of a tubular grid construction so that the carbon black passed in contact with and through the grid and out around support 16 into zone 24 where the carbon black was quenched by quench introduced through conduit 15 prior to its removal from the reactor through conduit 8.

Connecting with electrodes 9 and 10 and extending through the wall of the reactor were leads 17 and 19, respectively, which were terminally connected to a prime mover 21 for conversion of the electrical energy generated. Means were incorporated in the circuit so established to impress an alternating current on electrode 9 to initiate the flow of electrons thereto.

In the specific reactor employed, zone 4 had a diameter of 20 cm. 62.5 barrels per hour of conventional hydrocarbon feed were introduced into the reactor with about 58,000 pounds per hour of air.

Electrode 9 was of a circular configuration with a grid spacing of about 1 cm. It was located just outside the flame impingement zone.

The leading edge of electrode 10 was located about 2 cm. downstream of electrode 9. It was about 30 cm. in length and had an area of about 540 sq. cm., its grid spacing being about 1 cm. The temperature proximate its location was about 2,000° F.

Passage of the reactants from the burner was at a rate of approximately 31 meters per second. The temperature at the burner was about 3,000° F. and the reactor pressure at the upstream electrode was 5 atmospheres, the distance from the feed nozzle discharge to the upstream electrode being about 100 cm.

Leading from the two electrodes to the exterior of the reactor were two electrical leads which were connected to power generation indicating means where it was indicated that the power generated was 1,420 amperes at 380 volts.

Application of an electric field was made by means 20 to electrode 9 to accelerate the electrons and change their direction of travel.

Downstream of the second electrode, the reactor was enlarged to 30 cm. Positioned a sufficient distance downstream of the second electrode so as not to impinge thereon, were located a plurality of quench introductory lines by which the smoke temperature was reduced to 650° F. prior to its removal from the reactor.

The above example is only meant to typify the method and apparatus of this invention by suggesting the general principles involved. For example, while in the above example an inlet to exhaust pressure ratio of about 5 was employed, this ratio may vary from about 1½ to about 10 within the preferred pressure range of operation of from 1 to 10 atmospheres. Similarly, while certain dimensions have been proposed for the reactor, it will be evident that a large range of such dimensions for all factors concerned, may be employed.

The product carbon black from a number of such runs would have the following property ranges:

| | |
|---|---|
| $N_2$ Surface Area | 55 meters²/gram |
| Structure, DBP | 120 cc./100 gram |

It will be evident from the above that modifications can be made to both the process and the apparatus of this invention. Such, however, are considered within the scope of this invention.

What is claimed is:

1. A carbon black furnace comprising:
    a. an insulated chamber closed at its upstream and downstream ends;
    b. reactant introductory conduits opening into said chamber at its upstream end;
    c. carbon black recovery conduit opening from said chamber at its downstream end;
    d. a burner positioned terminally of one of said reactant introductory conduits, said burner adapted to decompose a hydrocarbon feed to produce electrons and electrically charged particles of carbon black;
    e. first and second electrodes positioned within said chamber, said first electrode being positioned proximate said burner, said second electrode being positioned downstream of said first electrode so as to be contacted by said carbon black on passage through said chamber to neutralize said electrically charged particles of carbon black;
    f. means for impressing an electrical charge on said first electrode to cause said electrons to pass to said first electrode;
    g. electrical conduit means interconnecting said electrodes and adapted for passage of electrons from said first electrode to said second electrode; and,
    h. means for recovering electrical energy upon passage of said electrons from said first to said second electrode.

2. The carbon black furnace defined in claim 1 in which said electrodes are of the grid type.

3. The carbon black furnace defined in claim 1 in which quenching means are provided between the second electrode and the carbon recovery means opening from said chamber.

4. The carbon black furnace defined in claim 3 in which the first electrode is located about 40 inches downstream of said burner, the second electrode is located about 1 inch downstream of said first electrode.

5. A process for recovering electrical power from the pyrolytic decomposition of a hydrocarbon within a reactor which comprises:
    a. decomposing a hydrocarbon under carbon black forming conditions in the presence of a flame to produce charged carbon black particles and electrons;
    b. establishing an electrical charge on a first electrode to cause said electrons to flow to said first electrode and to separate said electrons from said charged carbon black particles;
    c. passing said charged carbon black particles into contact with a second electrode positioned downstream of and in contact with said first electrode by electrical conduit means;
    d. passing said electrons from said first electrode to said second electrode through said electrical conduit means to neutralize said charged carbon black particles; and,
    e. recovering the electrical energy produced by the passage of said electrons from said first electrode to said second electrode.

6. The process of claim 5 in which the passage of electrons from said first electrode to said second electrode is established exteriorly of said reactor.

7. The process of claim 5 in which the electrical charge is established on said first electrode by means of an alternating electrical current.

8. The process of claim 5 in which said second electrode is at a pressure less than the pressure at said flame.

9. The process of claim 6 in which the electrical charge is established on said first electrode by means of an alternating electrical current and said second electrode is at a pressure less than the pressure at said flame.

* * * * *